US006975999B2

(12) United States Patent
Moore (10) Patent No.: US 6,975,999 B2
(45) Date of Patent: Dec. 13, 2005

(54) METHODS AND SYSTEMS FOR MANAGING BUSINESS REPRESENTATIVE DISTRIBUTIONS

(75) Inventor: Raymond Moore, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 263 days.

(21) Appl. No.: 10/047,925

(22) Filed: Jan. 14, 2002

(65) Prior Publication Data

US 2003/0135402 A1 Jul. 17, 2003

(51) Int. Cl.⁷ ............................................. G06F 17/60
(52) U.S. Cl. ....................................................... 705/9
(58) Field of Search ...................................... 705/8–10

(56) References Cited

U.S. PATENT DOCUMENTS 6,067,525 A * 5/2000 Johnson et al. ................ 705/10
6,604,083 B1 * 8/2003 Bailey ............................ 705/10

FOREIGN PATENT DOCUMENTS

JP 2000-242690 A * 9/2000 ........... G06F 17/60

OTHER PUBLICATIONS

"CACI Information Solutions" (published Summer 2001 in Marketing Solutions Today and retrieved from <URL:http://www.caci.co.uk/pdfs/mst_Summer_2001.pdf> on May 17, 2003).*
"CACI Limited Home Page" (dated Jun. 2001 and retrieved from <URL: http://web.archive.org/web/20010610010807/www.caci.co.uk> on May 26, 2003).*
Grenfell, Ronald Ian. "A Predictive Model of Field Sales Activity for Sales Territory Design Using GIS." Dissertation Abstracts International, vol. 58/06-A, p. 2301 (193 pages), 1996.*
Boucher, Jim. "Selecting the Right Number of Salespeople for the Job." Bank Marketing, vol. 27, No. 7, p. 102 (7 pages), Jul. 1995.*
Skiera, Bernd & Sonke Albers. "COSTA: Contribution Optimizing Sales Territory Alignment." Marketing Science, vol. 17, No. 3, pp. 196-213, 1998.*

* cited by examiner

Primary Examiner—Susanna M. Diaz
(74) Attorney, Agent, or Firm—Townsend and Townsend and Crew LLP (57) ABSTRACT

A geographical distribution of business representatives is managed by their assignment to geographical units. The assignments are stored on a storage device and a graphical interface permits changes in accordance with management determinations. The graphical interface includes a map on which an area is traced to define a closed geographical area. Any geographical units within the closed geographical area are identified. After the geographical units are identified, their stored characteristics are modified in response to an instruction from a user.

20 Claims, 6 Drawing Sheets

METHODS AND SYSTEMS FOR MANAGING BUSINESS REPRESENTATIVE DISTRIBUTIONS

BACKGROUND OF THE INVENTION

This application relates generally to the field of market analysis. More specifically, this application relates to methods and systems for managing business representative distributions.

Many businesses approach marketing of their goods and/or services in the same general fashion, i.e. by assigning representatives to be responsible for specific geographical areas. The task of each such representative is therefore narrowly defined. The representative is responsible for monitoring the activity of individual locations (such as stores) where products are provided, the activity of competitors within the geographical area, and for marketing his business's goods and/or services in that geographical area. Limiting the scope of each representative's duties in this fashion permits the business to participate effectively in activities in large geographical areas by ensuring that each representative is responsible for only a manageable portion of the large geographical area. In addition, evaluation of the performance of individual representatives may be determined by comparing the performance of each representative in his assigned area with the average performance of all representatives assigned to comparable areas.

When the total size of the area being covered by the business is large, such as for the entire United States, and the number of representatives is correspondingly large, the administration of the system itself may become cumbersome. Demographic changes in population, changes in business strategy, changes in sales volume at individual store locations, changes in personnel that comprise the representatives through termination, hiring, and attrition, and the effect of different experience levels resulting from those changes, may all need to be accommodated by periodic reassignment of representatives. In some instances, it may even be desirable to modify the manner in which the geographical area itself is partitioned. There is accordingly a general need in the art for methods and systems for managing a geographical distribution of business representatives that permits such reassignments and modifications to be performed easily and effectively.

BRIEF SUMMARY OF THE INVENTION

Embodiments of the invention thus provide a method for managing a geographical distribution of business representatives. The method makes use of geographical units to which business representatives may be assigned. Different types of geographical units may be accommodated depending on how the assignment of the business representatives is to take place. Such assignments are stored on a storage device and a graphical interface is provided to permit changes to be made to the stored assignments in accordance with management determinations made by a user. The graphical interface includes a map that may be configured by the user to show the desired geographical units, including both the types of geographical units desired and the scale at which the display is desired. In one embodiment, the graphical interface includes a digitizing pen and tablet that allow for freehand drawing of territorial boundaries.

The interface is used by tracing an area on the map display to define a closed geographical area. Such a trace may be provided in different ways in different embodiments, including, for example, by using mouse controls, by using a pen on a digitizing tablet, or by using a touch screen. Any geographical units within the closed geographical area are automatically identified. This is done in a fashion that does not require the closed geographical area necessarily to have the same shape as the geographical units selected; it is possible instead, for example, simply to use a freehand trace that circles the desired geographical units. In some embodiments, the geographical units are organized hierarchically so that they may correspond to a structural hierarchy of business representatives. After the geographical units are identified in this fashion, their stored characteristics are modified in response to an instruction from a user.

For example, in one embodiment, the stored characteristic of the identified geographical units is modified by assigning a business representative to them. If those geographical units had a prior business-representative assignment, the modification includes substituting the business-representative assignment for the prior assignment. In other embodiments, an established set of geographical units exists to define the full geographical scope to be covered by the business representatives. In one such embodiment, the stored characteristic of the selected geographical units may be modified to remove them from the established set; such a modification may thus be used to remove coverage of those geographical units from the full geographical scope. In another such embodiment, the stored characteristic of the selected geographical units may be modified to add them to the established set, thereby increasing the coverage of the full geographical scope.

The methods of the present invention may be embodied in a computer-readable storage medium having a computer-readable program embodied therein for directing operation of a computer system. Such a computer system may include an input device, an output device, a processor, and a storage device. The computer-readable program includes instructions for operating the computer system to manage the geographical distribution of business representatives in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Embodiments of the invention are directed generally to methods and systems for managing a geographical distribution of business representatives. Each business representative is assigned responsibility for one or more geographical units. The term "geographical unit" is used herein to refer generically to any contiguous or noncontiguous geographical area that may be assigned to a business representative.

Geographical units may also include a "type," which defines the manner in which they are determined. For instance, in some cases, the geographical units may correspond to areas defined by some external criterion; examples include geographical units whose type corresponds to postal or ZIP codes, geographical units whose type corresponds to telephone area codes, geographical units whose type corresponds to political divisions such as counties, and geographical units whose type corresponds to population divisions, such as census tracts or block groups. Such an external criterion may be useful to correlate information about the geographical units with demographic information from outside sources that is similarly organized. Such a correspondence to an external criterion is unnecessary, however, and the geographical units may alternatively be defined solely in terms of convenience for assignment of the business representatives. One such example is a designated market area ("DMA") defined internally within the business.

In some embodiments, both the business representatives and the geographical units may have types that are organized hierarchically. For example, in one embodiment, the geographical units for the United States may correspond to each state at the highest level, to each county at the next level, to each census tract at the next level, and to each block group at the lowest level. Such an organization parallels a commonly used hierarchy for storing demographic records, with a census tract typically covering about 2500 households and a block group covering about 300 households. The hierarchy of business representatives mimics the geographical-unit hierarchy with top-level business representatives (say, "regional managers") each being responsible for one or more states, with the next level of business representatives (say, "managers") each being responsible for one ore more counties, with the next level of business representatives (say, "territory managers") each being responsible for one or more census tracts, and with the next (lowest) level of business representatives (say, "salespeople") each being responsible for one or more block groups. This hierarchy may correspond additionally to a management reporting-line hierarchy within the business, with salespeople reporting to supervisors, supervisors reporting to assistant managers, and assistant managers reporting to managers. In some further embodiments, a business representative may be assigned responsibility for geographical units independently of the hierarchical organization; for example, a business development manager may be assigned responsibility for management of business strategies in geographical units across the hierarchy.

Figure 1A:
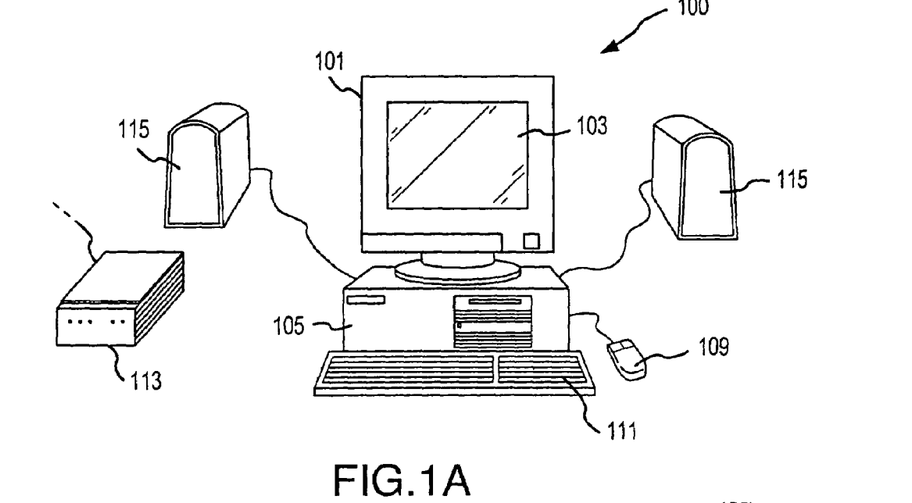
FIG. 1A is a perspective drawing of a personal computer that may be used in certain embodiments of the invention.

Embodiments of the invention permit maintaining the assignment of business representatives to geographical units with a simple user interface in a microprocessor-based system. In some embodiments, the microprocessor-based system comprises a computer system, such as shown with the simplified diagrams of FIGS. 1A and 1B, but may alternatively comprise a workstation, a network computer, a portable computer, a notebook computer, a palmtop computer, or other interface device. It is specifically noted that in some such alternative embodiments, the interface device comprises a portable hand-held device. In FIG. 1A, the computer system 100 includes a variety of elements, such as a display device 101 having a display screen 103, a cabinet 105 to house operational components of the computer, a keyboard 111, a modem 113, a set of speakers 115, and a mouse 109. The mouse 109 and keyboard 111 are examples of a wider class of user input devices. Other examples of user input devices that may be used with embodiments of the invention include touch screens, light pens, track balls, data gloves, speech-recognition units, and the like.

Figure 1B:
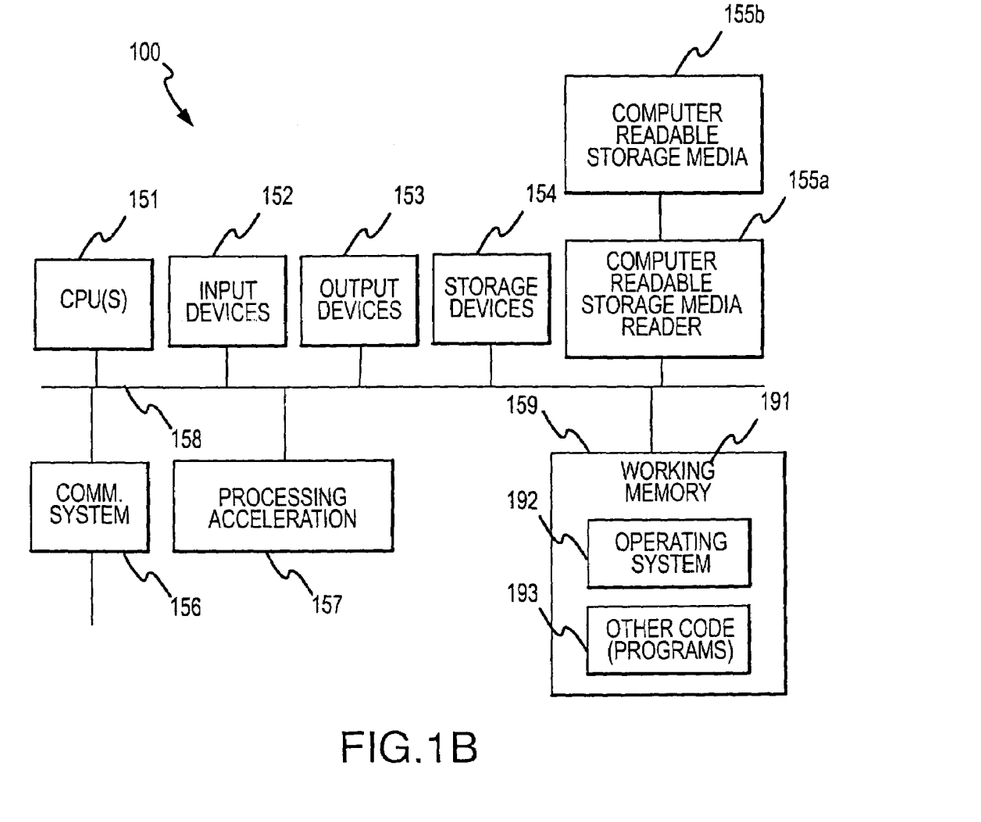
FIG. 1B is a schematic drawing of a general computer system that may be used with embodiments of the invention.

A schematic illustration for one configuration of the computer system 100 is provided in FIG. 1B. This figure broadly illustrates how individual system elements may be implemented in a separated or more integrated manner. The computer system 100 is shown comprised of hardware elements that are electrically coupled via bus 158, including one or more input devices 152 (such as the keyboard 111 and mouse 109) and one or more output devices 153 (such as the display device 101 and speakers 115). Also coupled via the bus 158 are various elements housed within the cabinet 105 including one or more storage devices 154, a computer-readable storage media reader 155a, a communications system 156, a processing acceleration unit 157 such as a DSP or special-purpose processor, and a memory 159. The computer-readable storage media reader 155a is further connected to a computer-readable storage medium 155b, the combination comprehensively representing remote, local, fixed, and/or removable storage devices plus storage media for temporarily and/or more permanently containing computer-readable information. The communications system 156 may, for example, provide a connection with the internet and may comprise a wired, wireless, modem, and/or other type of interfacing connection.

The computer system 100 also comprises software elements, shown as being currently located within working memory 191, including an operating system 192 and other code 193, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

According to embodiments of the invention, software is used to provide a map on the display screen 103, which is used as an interface for managing the geographical distributions of the business representatives. In one specific embodiment, the computer system 100 is a PC-based system running a Windows™ based operating system to support a map-generation program such as MapPoint®, available from Microsoft® Corp. of Redmond, Wash. One advantage of configuring the system to use the MapPoint® program for map-generation features is that it is equipped with functionality permitting import of data from other Windows™ based programs such as Access, Excel, and Outlook®, and export of data to other Windows™ based programs such as Word and PowerPoint®, all also available from Microsoft® Corp. This exemplary system configuration is not intended to limit the scope of the claims herein, since alternative embodiments may use different operating systems and map-generation software.

Figure 2:
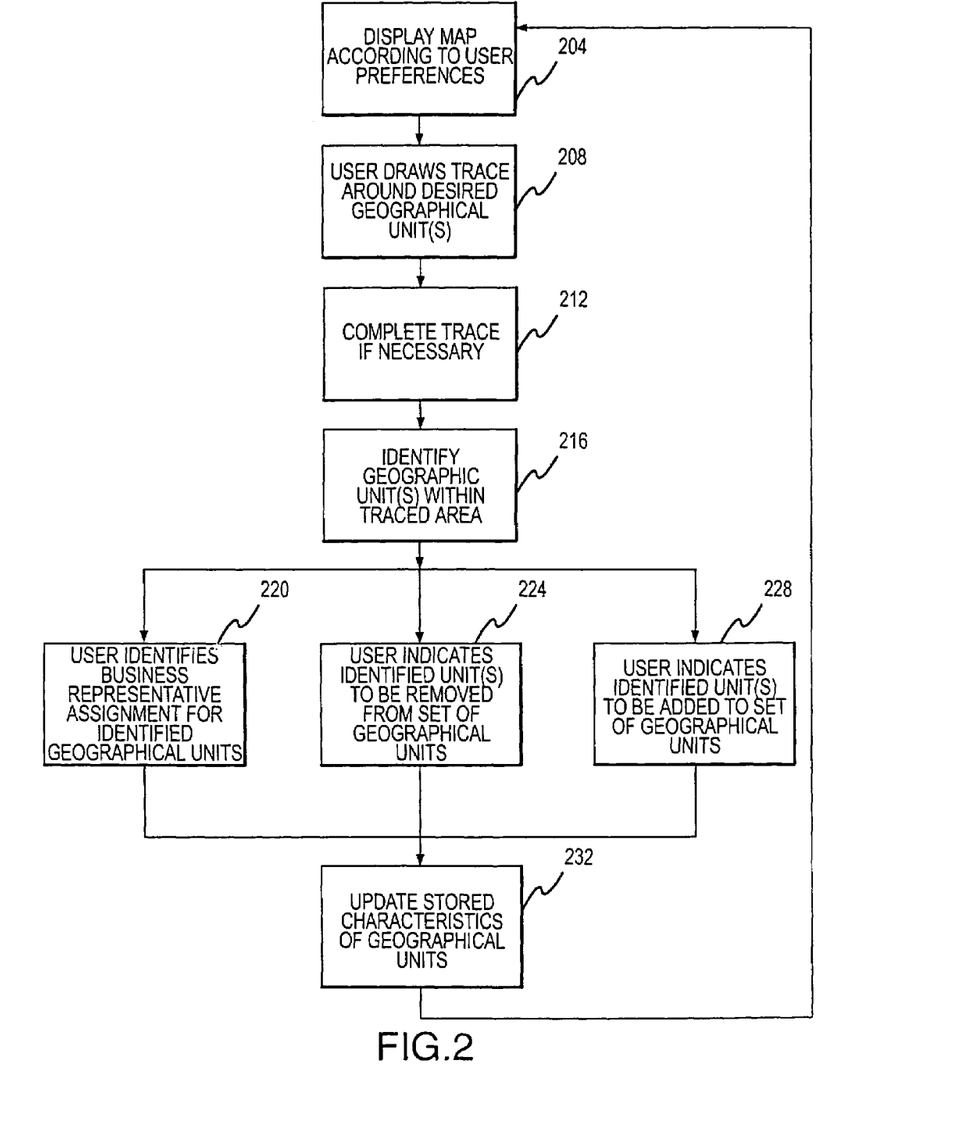
FIG. 2 is a flow diagram illustrating different methods for managing a distribution of business representatives according to embodiments of the invention.

An overview of the methods of the invention is illustrated with the flow diagram provided in FIG. 2. The following description of such methods sometimes also makes reference to FIGS. 3A–3D, which provide exemplary screen shots of an embodiment implemented on a computer system as described above. Information regarding the assignment of business representatives to specific geographic units is generally maintained on one of the storage devices 154 and may be updated as described below through interaction of a user with the map interface.

Thus, at block 204 of FIG. 2, a map is displayed according to preferences specified by the user. Such preferences may include a scale for the map, permitting the display of larger or smaller geographical units as may be desired. For example, the map might display the entire United States or might display a zoomed view showing only a small number of block groups. Such a scaling ability is particularly useful in permitting the management of different hierarchies of geographical units and business representatives as desired. In addition, the preferences specified by the user may include the type of the geographical units to be displayed with boundary lines on the map.

Figure 3A:
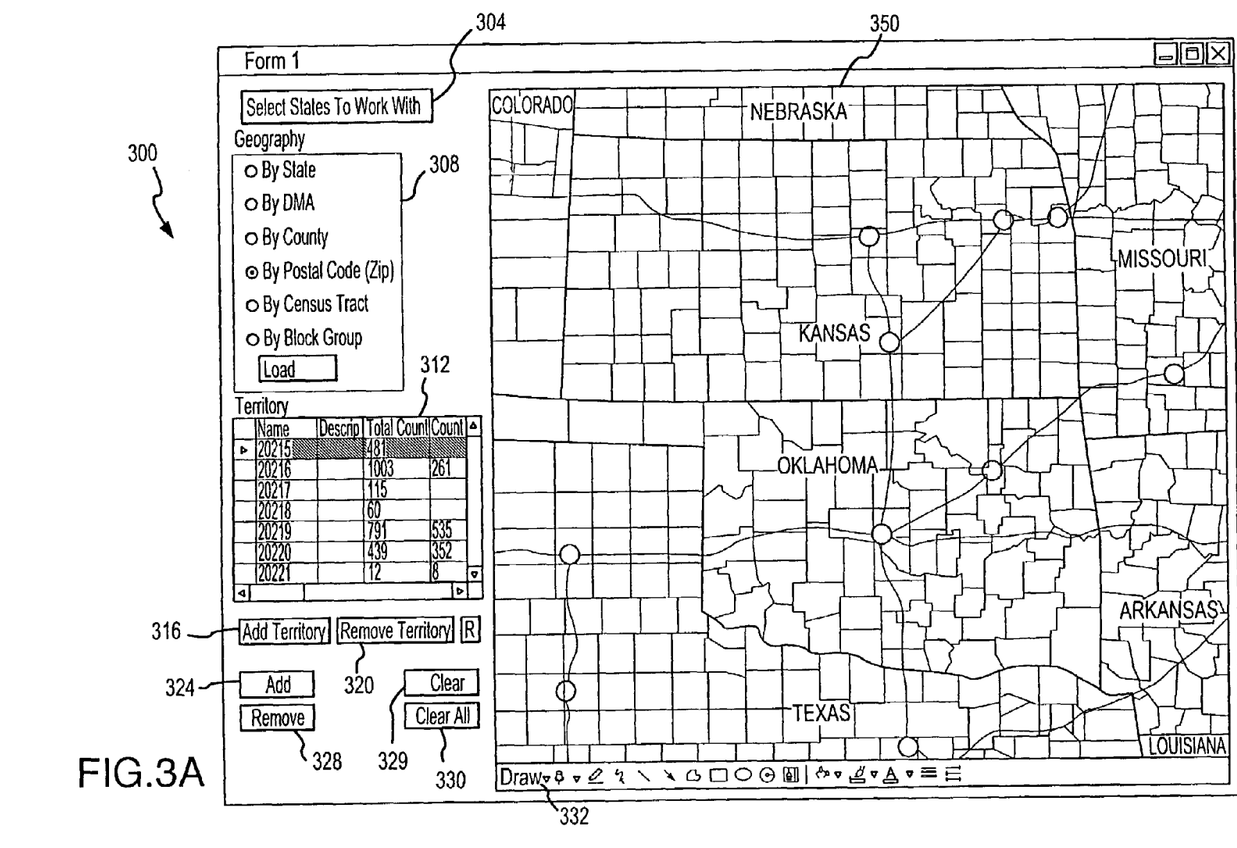
FIGS. 3A–3D are sample screen shots illustrating the application of one such embodiment of the invention.

For example, in FIG. 3A, the display 300 includes a map 350 showing a plurality of states within the United States. The entirety of Oklahoma and Kansas are shown, as well as surrounding portions of Colorado, Nebraska, Missouri, Arkansas, Louisiana, and Texas. Type divisions on the illustrated map correspond to ZIP codes, with different ZIP-code geographical units being colored differently to indicate their assignment to different business representatives. Unassigned geographical units may be displayed in a specific color to indicate that they have not yet been assigned to the responsibility of any business representative. In alternative embodiments, different color schemes may be used, such as by coloring geographical units according to volume handled by the representatives.

Furthermore, embodiments of the invention also contemplate circumstances where a business is not interested in managing all possible geographic units that may be displayed, perhaps because the geographic scope of its business is limited. Under such circumstances, the stored characteristics of the geographic units indicates whether they belong to an "established set" of geographic units. Units included in the established set are those that the business is interested in actively managing; conversely, those geographic units excluded from the established set correspond to those that the business does not currently wish to manage. The geographic units excluded from the established set are generally shown in a specially designated color on the map 350 to identify them as such.

The functionality of the display is controlled primarily with the function keys on the left panel of the display 300. At the top of the display 300 is a button 304 that acts as a drop-down menu to select which states are to be displayed. In the illustrated example, Kansas and Oklahoma have been selected. Below button 304 is a "Geography" set 308 of radio buttons that permit the desired types of geographical-unit divisions to be selected. In the illustration, selections are provided for state, designated market area ("DMA"), county, postal code, census tract, and block group selections, although other types may alternatively be provided for selection.

Below the Geography selection 308 is a "Territory" summary 312 used to identify business representatives whose assignments may be managed. In the illustration, the Territory summary 312 includes a table that (1) identifies each of the business representatives ("Name"), using an identification number in the example; (2) provides additional information ("Description") about each business representative if desired; and (3) provides two count fields that are used to summarize numerically the geographic coverage of that representative. For example, because the display is currently organized by ZIP code, the "Total Count" field shows the total number of ZIP codes assigned to each of the business representatives and the "Count" field shows the number of ZIP codes within the displayed map 350 that are assigned to each such business representative. The "Add Territory" and "Remove Territory" buttons 316 and 320 are used respectively as described below to add or remove territories from the assignment of specific representatives.

The remaining set of buttons, "Add" 324, "Remove" 328, "Clear" 329, and "Clear All" 330 may be used more generally to control the content of the established set of geographical units.

Figure 3B:
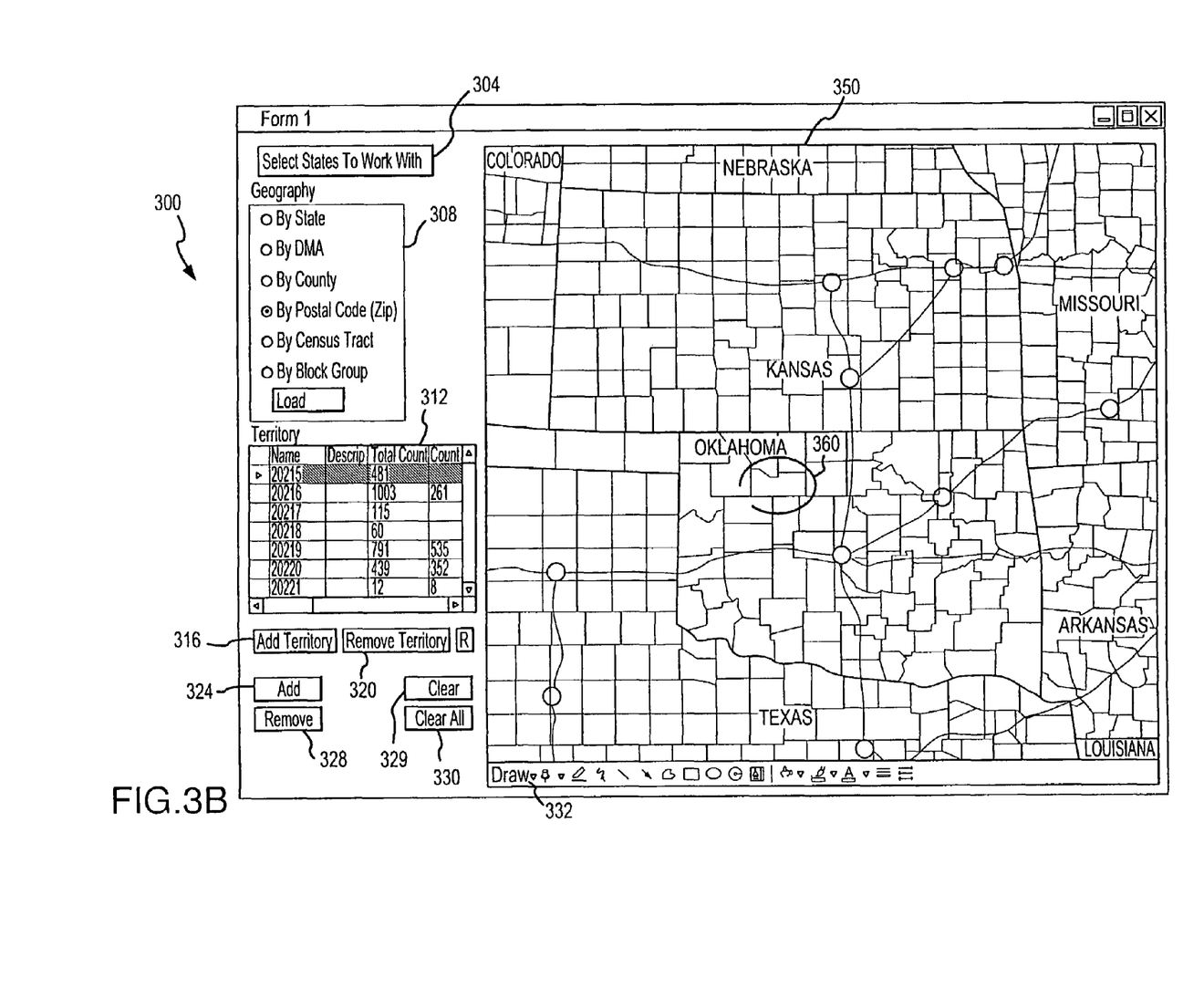

Below the map 350 is a "Draw" facility 332 that permits traces to be drawn on the map 350 by using the mouse 109. The illustrated Draw facility 332 functions by selecting the type of trace and then drawing the trace on the map 350 in the desired shape with the mouse buttons. Accordingly, at block 208 of FIG. 2, the user draws a trace to surround those geographical units on which management functions are to be performed. In alternative embodiments, the trace may be drawn with a different input device, such as with a light pen. An example of a trace 360 drawn by the user is shown in FIG. 3B. In some instances, the trace 360 may form a closed loop, but in others, as shown, it may be an open loop. Thus, at block 212, the trace is completed internally by the system to form a closed loop so that any geographic units within the traced area may be identified at block 216. Completion of the trace at block 212 may simply join the endpoints of the open trace linearly or may use a more sophisticated algorithm to join the endpoints with a curved segment. Since the open trace may be completed in this fashion, it defines a closed geographical area as effectively as does a closed trace.

Figure 3C:
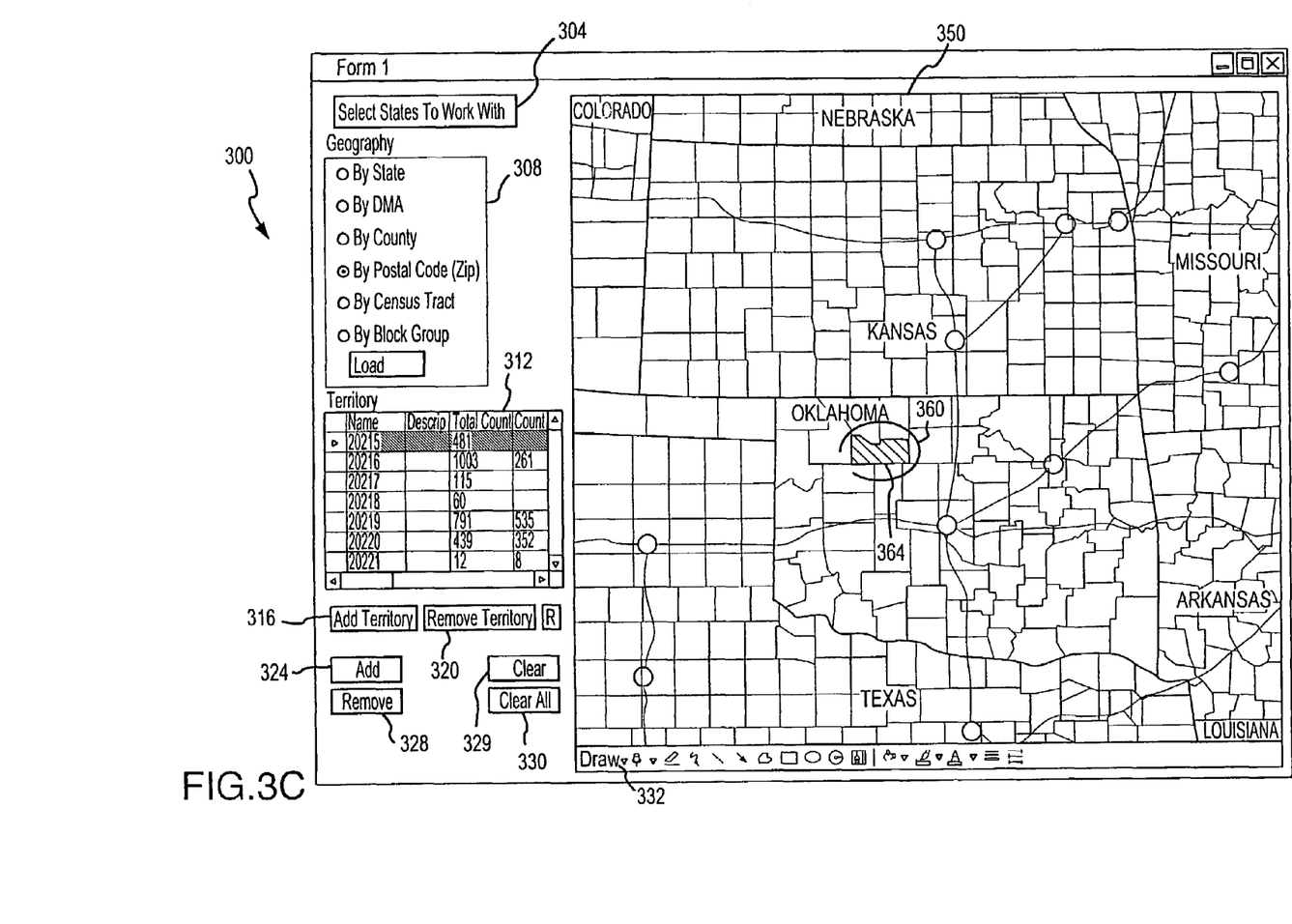
Figure 3D:
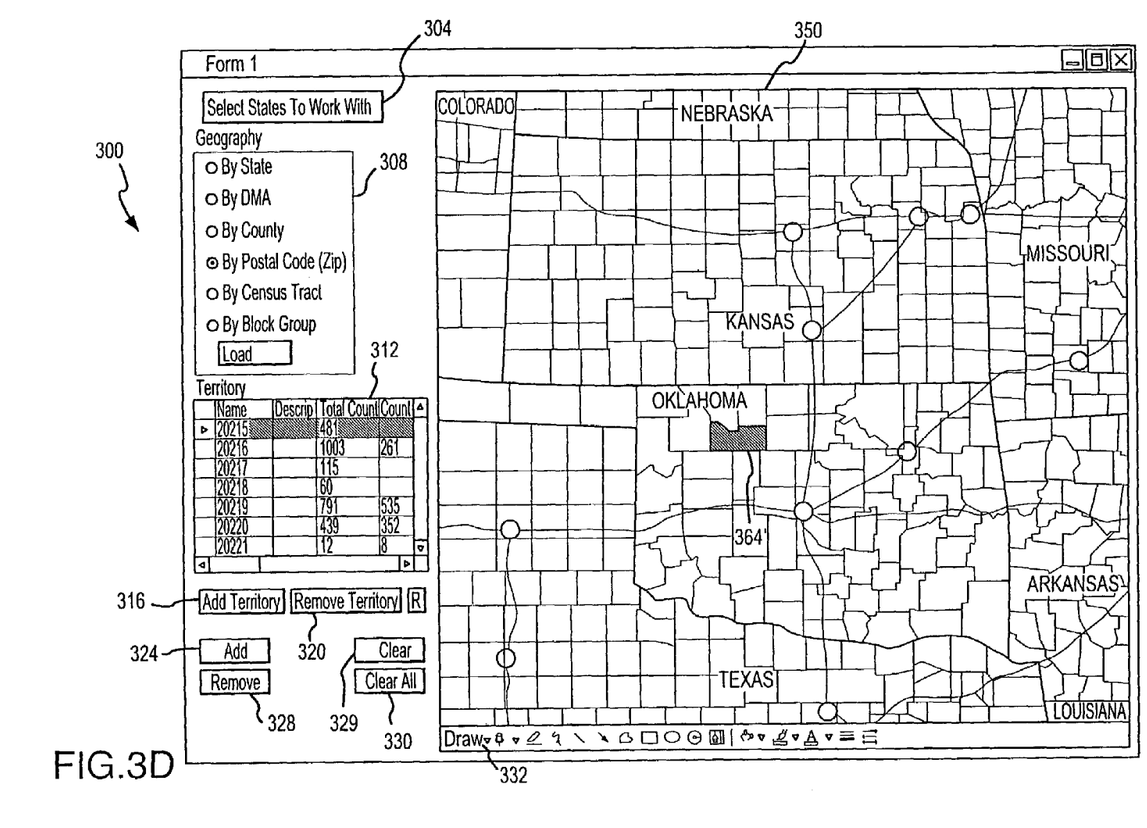

Identification of the enclosed geographic units at block 216 may include highlighting the identified geographic unit(s) as shown by reference numeral 364 in FIG. 3C. At this point, there are a variety of different management functions that may be performed with the identified geographic unit(s) 364. For example, if the identified geographic unit(s) 364 is included in the established set of geographic units, the user may change the existing business-representative assignment for it at block 220. If the unit(s) 364 is currently assigned to a particular business representative, that representative is automatically highlighted by the system in the Territory summary 312; the assignment to that representative may be removed by clicking on the "Remove Territory" button 320. Similarly, to assign the geographic unit 364 to a new business representative, the new representative is highlighted with the mouse and the "Add Territory" button 316 activated. If the geographic unit 364 was previously not assigned to any business representative, this action has the effect of assigning it; if it was previously assigned, this action both removes the previous assignment and effects the new assignment to the selected business representative.

In other embodiments, the user is provided with the capability of managing which geographic units are included in the established set. Thus, for example, at block 224, the user may indicate that the identified geographic unit 364 is to be removed from the set by clicking on the "Remove" button 324. If the geographic unit 364 is not part of the established set, so that it would be impossible to assign any of the business representatives to it, it may be added at block 228 by clicking on the "Add" button 316.

The effect of any of the management functions performed at blocks 220, 224, or 228 is to update the stored characteristics for the geographical units at block 232 to reflect the management changes. The system also modifies the display 300 at block 204 to reflect any changes. Such changes may be reflected on the map 350 by changing the color of the identified geographic unit 364, as shown, for example, in FIG. 3D where that unit is denoted 364' to reflect that it has been reassigned in accordance with the change. Other color-change updates may reflect the addition or removal of the identified unit(s) to or from the established set. All such changes may also be reflected in the Territory summary 312 by updating the "Total Count" and/or "Count" fields for any business representative that may have had a change in geographic-unit assignments.

Various features of the system provide advantages in managing the geographic distribution of business representatives. Some of these advantages derive from the ability to import and/or export data with other computer programs. For example, data provided by the system may be organized according to precanned reporting features to generate reports regarding activity in the geographical units. The interaction with other computer programs may also be used in a specific embodiment for case certification of addresses used to define locations in the geographical units.

In other embodiments, the distribution of business representatives may be correlated with geographic market-intelligence and demographic information, such as derived according to the methods and systems described in copending, commonly assigned U.S. patent application Ser. No. 10/028,471 entitled "METHODS AND SYSTEMS FOR DEVELOPING MARKET INTELLIGENCE," filed Dec. 19, 2001 by Raymond Moore ("the market-intelligence application"), the entire disclosure of which is herein incorporated by reference for all purposes. By comparing internal and competitor sales information with an existing distribution of business representatives, it is possible to determine more effective reassignments of business representatives to achieve a competitive advantage. Various circumstances that may warrant reassignment are described in the market-intelligence application. Including demographic information organized according to the desired geographic-unit scheme permits even more effective reassignments to be made, as also described in the market-intelligence application.

The system also permits easy accommodation of changes in externally based geographic units. For example, if a ZIP code is divided by the postal service in response to an increase in population, the system automatically assigns any agents for that ZIP code to all the geographic units resulting from the division. The storage of information on a geographic basis also facilitates the generation of reports regarding the status of business-representative distribution. Various other uses and advantages of the system will be evident to those of skill in the art after reading the foregoing description.

Having described several embodiments, it will further be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for managing a geographical distribution of business representatives, the method comprising:
   receiving, with a microprocessor-based system, a trace defining a closed geographical area, the trace being received as a representation of a line drawn by a user on an interface displaying a map having a plurality of geographical units to select a portion of the map, each geographical unit being associated with information indicating assignment of the each geographical unit to a business representative;
   identifying, with the microprocessor-based system, at least one geographical unit contained within and surrounded by a boundary of the closed geographical area, the at least one geographical unit and the closed geographical area being noncoextensive;
   modifying, with the microprocessor-based system, the map displayed on the interface to highlight the identified at least one geographical unit;
   identifying, with the microprocessor-based system, the business representative assigned to the at least one geographical unit for display to the user;
   receiving, with the microprocessor-based system, information provided by the user specifying a change in assignment of the at least one geographical unit to a new business representative; and
   modifying, with the microprocessor-based system, a stored characteristic associated with the at least one geographical unit to reflect the change in assignment of the at least one geographical unit to the new business representative.

2. The method recited in claim 1 wherein receiving a trace defining a closed geographical area comprises receiving a freehand trace.

3. The method recited in claim 2 wherein the freehand trace is provided with a pen and digitizing tablet.

4. The method recited in claim 2 wherein the freehand trace is provided with a touch screen.

5. The method recited in claim 1 wherein the at least one geographical unit is comprised by an established set of geographical units.

6. The method recited in claim 5 further comprising updating an assignment of business representatives to geographical units in accordance with a change in the established set of geographical units.

7. The method recited in claim 1 wherein the at least one geographical unit is comprised by a hierarchy of geographical units.

8. The method recited in claim 1 wherein modifying the stored characteristic associated with the at least one geographical unit comprises removing the at least one geographical unit from an established set of geographical units.

9. The method recited in claim 1 wherein modifying the stored characteristic of the at least one geographical unit comprises adding the at least one geographical unit to an established set of geographical units.

10. The method recited in claim 1 further comprising displaying an assignment of a plurality of business representatives to a plurality of geographical units graphically.

11. A computer-readable storage medium having a computer-readable program embodied therein for directing operation of a computer system including an input device, a display device, a processor, and a storage device, wherein the computer-readable program includes instructions for operating the computer system to manage a geographical distribution of business representatives in accordance with the following:
   receiving a trace from the input device defining a closed geographical area, the trace being received as a representation of a line drawn by a user on the display device displaying a map having a plurality of geographical units to select a portion of the map, each geographical unit being associated with information indicating assignment of the each geographical unit to a business representative;
   identifying at least one geographical unit contained within and surrounded by a boundary of the closed geographical area with the processor, the at least one geographical unit and the closed geographical area being noncoextensive;

modifying the map displayed on the display device to highlight the identified at least one geographical unit;

identifying the business representative assigned to the at least one geographical unit for display to the user on the display device;

receiving information provided by the user specifying a change in assignment of the at least one geographical unit to a new business representative; and modifying a stored characteristic associated with the at least one geographical unit on the storage device to reflect the change in assignment of the at least one geographical unit to the new business representative.

12. The computer-readable storage medium recited in claim 11 wherein the at least one geographical unit is comprised by an established set of geographical units.

13. The computer-readable storage medium recited in claim 12 wherein the computer-readable program further includes instructions for updating an assignment of business representatives to geographical units in accordance with a change in the established set of geographical units.

14. The computer-readable storage medium recited in claim 11 wherein the at least one geographical unit is comprised by a hierarchy of geographical units.

15. The computer-readable storage medium recited in claim 11 wherein the computer-readable program further includes instructions for displaying an assignment of a plurality of business representatives to a plurality of geographical units graphically on the display device.

16. A computer system comprising:
an input device;
a storage device;
a display device;
a processor in communication with the input device, the display device, and the storage device; and
a memory coupled with the processor, the memory comprising a computer-readable storage medium having a computer-readable program embodied therein for operating the computer system to manage a geographical distribution of business representatives, the computer-readable program including:
 instructions for receiving a trace from the input device defining a closed geographical area, the trace being received as a representation of a line drawn by a user on the display device displaying a map having a plurality of geographical units to select a portion of the map, each geographical unit being associated with information indicating assignment of the each geographical unit to a business representative;
 instructions for identifying at least one geographical unit contained within and surrounded by a boundary of the closed geographical area with the processor, the at least one geographical unit and the closed geographical area being noncoextensive;
 instructions for modifying the map displayed on the display device to highlight the identified at least one geographical unit;
 instructions for identifying the business representative assigned to the at least one geographical unit for display to the user on the display device;
 instructions for receiving information provided by the user specifying a change in assignment of the at least one geographical unit to a new business representative; and
 instructions for modifying a stored characteristic associated with the at least one geographical unit on the storage device to reflect the change in assignment of the at least one geographical unit to the new business representative.

17. The computer system recited in claim 16 wherein the at least one geographical unit is comprised by an established set of geographical units.

18. The computer system recited in claim 17 wherein the computer-readable program further includes instructions for updating an assignment of business representatives to geographical units in accordance with a change in the established set of geographical units.

19. The computer system recited in claim 16 wherein the at least one geographical unit is comprised by a hierarchy of geographical units.

20. The computer system recited in claim 16 wherein the computer-readable program further includes instructions for displaying an assignment of a plurality of business representatives to a plurality of geographical units graphically on the display device.

* * * * *